(12) United States Patent
Zinoviev et al.

(10) Patent No.: US 8,019,854 B2
(45) Date of Patent: Sep. 13, 2011

(54) SYSTEM AND METHOD OF PROVIDING INFORMATION ON COMPUTER MEMORY USE

(75) Inventors: Alexander Zinoviev, Moscow (RU); Dmitry Evstigneev, Moscow (RU); Alexey Fadeev, Moscow (RU)

(73) Assignee: Samsung Electronics Co., Ltd., Suwon-Si (KR)

( * ) Notice: Subject to any disclaimer, the term of this patent is extended or adjusted under 35 U.S.C. 154(b) by 1084 days.

(21) Appl. No.: 11/286,346

(22) Filed: Nov. 25, 2005

(65) Prior Publication Data

US 2007/0124408 A1 May 31, 2007

(51) Int. Cl.
*G06F 15/173* (2006.01)
*G06F 15/16* (2006.01)

(52) U.S. Cl. .................................. 709/224; 709/246

(58) Field of Classification Search .................. 709/223, 709/224, 246
See application file for complete search history.

(56) References Cited

U.S. PATENT DOCUMENTS

| | | | | |
|---|---|---|---|---|
| 5,136,291 A * | 8/1992 | Teague | .............................. | 341/83 |
| 5,359,429 A * | 10/1994 | Takahashi | ...................... | 358/439 |
| 6,597,907 B1 * | 7/2003 | Pruitt et al. | .................... | 455/423 |
| 7,188,227 B2 * | 3/2007 | Luick | ............................ | 711/172 |
| 2002/0152305 A1 * | 10/2002 | Jackson et al. | ................ | 709/224 |
| 2003/0124979 A1 * | 7/2003 | Tanada et al. | .................... | 455/41 |
| 2003/0212761 A1 * | 11/2003 | Meredith et al. | .............. | 709/218 |
| 2004/0068627 A1 * | 4/2004 | Sechrest et al. | ............... | 711/158 |
| 2004/0073742 A1 | 4/2004 | Arimilli et al. | | |
| 2004/0148363 A1 * | 7/2004 | Hadi | .............................. | 709/217 |
| 2005/0010667 A1 * | 1/2005 | Moriki et al. | .................. | 709/226 |
| 2005/0216692 A1 * | 9/2005 | Watanabe et al. | .............. | 711/170 |
| 2005/0273450 A1 * | 12/2005 | McMillen et al. | ................. | 707/1 |
| 2006/0100776 A1 * | 5/2006 | Weiss et al. | ..................... | 701/200 |
| 2006/0200593 A1 * | 9/2006 | Kambayashi et al. | .......... | 710/15 |
| 2006/0224711 A1 * | 10/2006 | Engel et al. | .................... | 709/223 |
| 2006/0225135 A1 * | 10/2006 | Cheng et al. | ..................... | 726/26 |
| 2006/0253507 A1 * | 11/2006 | Schank et al. | ................ | 707/205 |
| 2007/0027983 A1 * | 2/2007 | Bowra et al. | ................... | 709/224 |
| 2007/0077993 A1 * | 4/2007 | Midgley et al. | ................. | 463/42 |

FOREIGN PATENT DOCUMENTS

RU 2182375 C2 4/1997

OTHER PUBLICATIONS

Microsoft Computer Dictionary, Copyright 2002, p. 378.*
IBM, IBM Tivoli Monitoring Version 5.1.1, Aug. 2003, 540 pgs.*

\* cited by examiner

*Primary Examiner* — Patrice L Winder
*Assistant Examiner* — Ebrahim Golabbakhsh
(74) *Attorney, Agent, or Firm* — Sughrue Mion, PLLC

(57) ABSTRACT

A system and method of providing information about memory use of a remote computer upon a user's request. The system includes an operating system core (kernel), an operating system core unit, a coupling unit, and an agency unit connected to an interrogating computer by a communication channel. The agency unit operates to receive the user request, to convert the user request, to transfer the converted user request to the operating system core unit through the coupling unit, to obtain the information about the computer memory use from the operating system core unit through the coupling unit, and to transfer the obtained information to the interrogating computer. The coupling unit operates to establish an access to the operating system core unit and transfer data from the agency unit to the operating system core unit and from the operating system core unit backward to the agency unit.

15 Claims, 1 Drawing Sheet 1a, 1b, ... 1n - Interrogated Computers
2a, 2b, ... 2n - Interrogating Computers
3 - Communication Channel
4a, 4b, ... 4n - Operating System Cores
5a, 5b, ... 5n - Operating System Core Units
6a, 6b, ... 6n - Coupling Units
7a, 7b, ... 7n - Agency Units
8a, 8b, ... 8n - Client Units
9a, 9b, ... 9n - Display Units 1a, 1b, ... 1n - Interrogated Computers
2a, 2b, ... 2n - Interrogating Computers
3 - Communication Channel
4a, 4b, ... 4n - Operating System Cores
5a, 5b, ... 5n - Operating System Core Units
6a, 6b, ... 6n - Coupling Units
7a, 7b, ... 7n - Agency Units
8a, 8b, ... 8n - Client Units
9a, 9b, ... 9n - Display Units

SYSTEM AND METHOD OF PROVIDING INFORMATION ON COMPUTER MEMORY USE

BACKGROUND OF THE INVENTION

1. Field of the Invention

The present invention relates to a system and a method of providing information on a computer memory use. More particularly, the present invention relates to a system and a method which is applicable to any computer and provides information on the computer memory use.

2. Description of the Related Art

At present, many types of computer memory are known. Existing types of memory are either a volatile memory or a non-volatile memory. The volatile memory stores the contents only while supplied with (electric) power and loses the contents when the power supply is disabled, whereas the non-volatile memory stores the contents for indefinite period of time even in the absence of power. The types of memory may further be classified into recordable memory and read-only memory (ROM).

The volatile memory type is usually represented by a random-access memory (RAM). The RAM is usually re-writable, whereas the ROM is a permanent storage device. Such a difference is not very strict and certain features of ROM allow changing of the stored contents, although some problems are encountered. For instance, there are various types of the ROM such as Programmable ROM (PROM), Electrically Erasable PROM (EEPROM), and a flash-memory.

Various types of memory have different characteristics (for example, executing readings at different times and different performance characteristics). Therefore, in many cases, it is desirable to use a combination of memories including several different types of memories in one computer system. Thus, there is a problem of intelligent use of various types of memory, namely minimization and ordering of the memory space occupied by various data, minimization of time it takes to access memory, and optimal allocation of stored data between various types of memories.

To solve the problem, it is necessary to have information on memory use. More precisely, the information regarding the size and location of data units stored in a computer memory is needed. Data units have virtual and physical memory addresses. Virtual memory addresses of data units exist only in a context of programs in which they are used and are meaningless outside these programs. Physical memory addresses are used for transfer of data units between the processor, memory and peripherals, and specify locations of data units in a computer memory. Thus, the knowledge of physical addresses of data units in a computer memory allows estimation of the size and location of the data units in memory.

The system and method of handling the physical memory are described in the U.S. Patent Application Publication No. 2004/0073742. The system and method are intended for storing data in the physical memory unit of a computer during extraction or replacement of a memory module. When the replacement or extraction of the physical memory unit of a computer is necessary, the system provides the information on the data stored in this unit, namely physical addresses of data, and copies data to a special area of memory. After replacement or addition of the memory block, the system extracts the copied data from that special area of memory and records the data in the added or substituted block.

The system and method presented above do not provide for obtaining information on the data stored in the memory, at a user's request at any moment in time, and do not allow this information to be output on a display unit of the remote computer of the user.

Another system and method of organizing a computer memory are disclosed in Russian patent RU 2182375. In RU 2182375, the flash-memory is split into separately recorded pages, and thus the information on the data stored in memory, namely the information on data structure, location or addressing of data units, is stored on one of the recorded pages, and that page can be updated whenever the information on the data stored in memory is amended.

The drawback of the system and method is that they do not allow obtaining the information on memory use for any computer, and provides only the information regarding the memory organization method. Moreover, the given system and method do not allow for a collection of information on memory use with high precision and speed. Furthermore, the system and method do not display this collection of information on display units of a computer of a remote user.

SUMMARY OF THE INVENTION

The present invention has been developed in order to solve the above drawbacks and other problems associated with the conventional arrangement. Illustrative, non-limiting embodiments of the present invention may overcome the above disadvantages and other disadvantages not described above. The present invention is not necessarily required to overcome any of the disadvantages described above, and the illustrative, non-limiting embodiments of the present invention may not overcome any of the problems described above. The appended claims should be consulted to ascertain the true scope of the invention.

An aspect of the present invention is to provide a system and method for providing information on usage of a computer memory with high reliability, accuracy, and speed, at user's request. Another aspect of the present invention is to display this information on a display unit of a computer of a remote user.

According to one aspect of the present invention, a system for providing information on a computer memory use is provided. The system includes at least one interrogating computers, at least one interrogated computers, and a communication channel. Each of the at least one interrogating computers includes a client unit connected to a display unit. Each of the at least one interrogated computers includes an operating system core (kernel), an operating system core unit, a coupling unit, and an agency unit connected with each of the at least one interrogating computers by a communication channel. The communication channel connects the interrogating computers and the interrogated computers.

The client unit operates to generate a user request requesting information on memory use of the interrogated computer, to transfer the user request to the agency unit, to receive the information from the agency unit, and to display the received information on the display unit.

The agency unit operates to receive the user request from the client unit, to convert the user request, to transfer the converted user request to the operating system core unit, to obtain the information on memory use of the interrogated computer from the operating system core unit through the coupling unit, and to transfer the obtained information to the client unit.

The coupling unit operates to establish an access to the operating system core unit and to transfer data from the agency unit to the operating system core unit and from the operating system core unit back to the agency unit.

The operating system core unit is positioned within the operation system core, obtains the information on memory use of the interrogated computer, stored in the operating system core, from the operating system core, and transfers the obtained information to the agency unit through the coupling unit.

The communication channel connecting the interrogating computers and the interrogated computers may be a communication channel of Ethernet with a standard stack of TCP/IP protocols.

The agency unit may be permanently in an active mode and may convert data code of the user request from an ASCII format into a binary code.

The information on memory use of each of the interrogated computers may be stored in the operating system core and may include information on physical addresses of data units of memory.

According to another aspect of the present invention, a method of providing information on memory use of a computer system is provided. The method includes generating a user request requesting the information on memory use of at least one interrogated computer in a client unit of at least one interrogating computer upon a user command, transferring the generated request to an agency unit of each of the interrogated computers, converting a data code of the user request at the agency unit, transferring the converted data code to an operating system core unit through a coupling unit, extracting the information on the memory use of the interrogated computer from an operating system core through the operating system core unit, transferring the extracted information to a client unit of the interrogating computer through the coupling unit and the agency unit, and displaying the information on a display unit.

The data code of the user request may be converted from an ASCII format into a binary code at the agency unit.

The information on memory use of the interrogated computer may include information on physical addresses of data units of memory and may be extracted from the operating system core along with additional information stored in the operating system core.

BRIEF DESCRIPTION OF THE DRAWINGS

The above aspects and features of the present invention will become more apparent by describing in detail an exemplary embodiment thereof with reference to the attached drawing, in which.

DETAILED DESCRIPTION OF THE EXEMPLERY EMBODIMENTS

Figure 1:
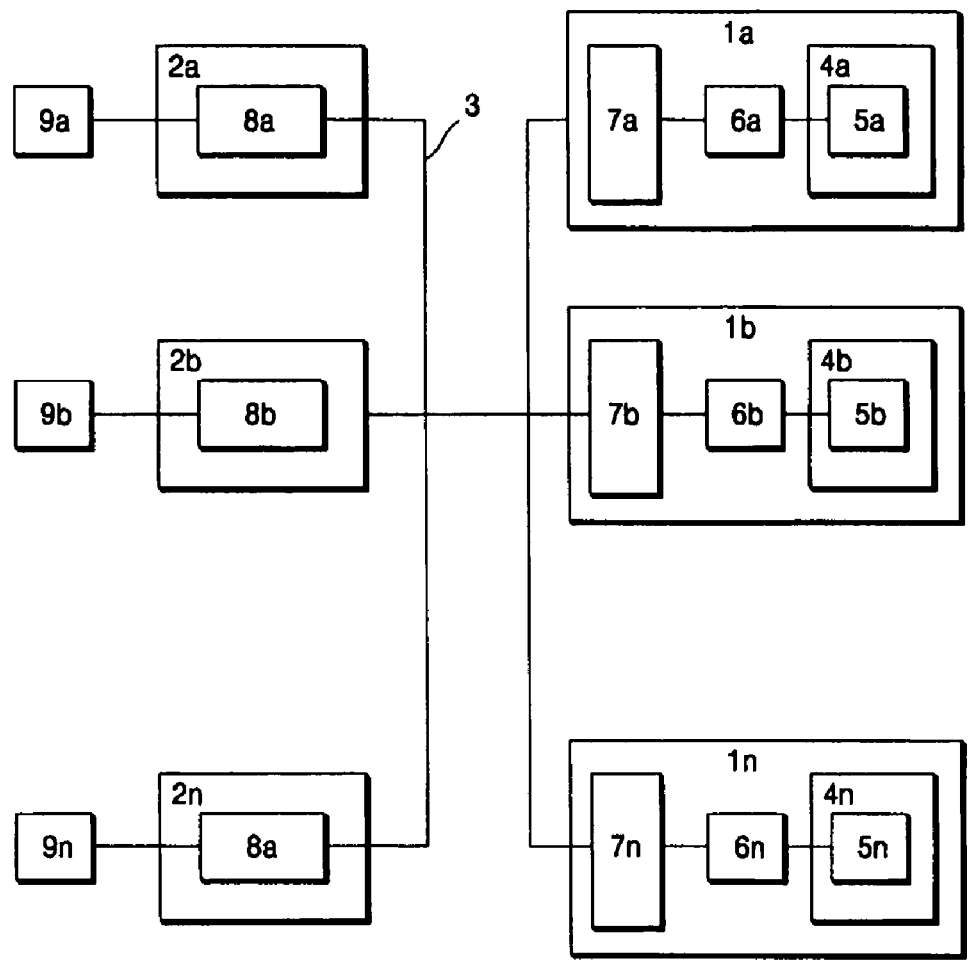
FIG. 1 is a schematic diagram of a system for providing information on usage of a computer memory according to an exemplary embodiment of the present invention.

Exemplary, non-limiting embodiments of the present invention will be described in greater detail with reference to the accompanying drawing. The matters defined in the description such as a detailed construction and elements are nothing but the ones provided to assist in a comprehensive understanding of the invention. Thus, it is apparent that the present invention can be carried out without those defined matters. Also, well-known functions or constructions are not described in detail since they would obscure the invention in unnecessary detail.

FIG. 1 illustrates a system for providing information on usage of a computer memory. The system depicted in FIG. 1 contains at least one interrogated computers $1_a, 1_b \ldots 1_n$ and at least one interrogating computers $2_a, 2_b \ldots 2_n$ connected to the interrogated computers $1_a, 1_b \ldots 1_n$ by a communication channel 3. The interrogated computer $1_a$ includes an operating system core $1_a$, an operation system core unit $5_a$, a coupling unit $6_a$, and an agency unit $7_a$. The operating system core unit $5_a$ is positioned within the operating system core $4_a$. The coupling unit $6_a$ and the operating system core unit $5_a$ are connected with each other. The interrogating computer $2_a$ includes a display unit $9_a$ and a client unit $8_a$ connected to the agency unit $7_a$ of the interrogated computer $1_a$. In the exemplary embodiment depicted in FIG. 1, the structures of the depicted interrogated computers $1b, \ldots 1n$ and interrogating computers $2b, \ldots 2n$ are analogous.

Next, according to an exemplary, non-limiting embodiment, the system operates as follows. The client unit 8 of the interrogating computer 2 is in a waiting mode to respond to a user request, in which the user requests information on memory use of the interrogated computer 1 and generates (e.g., creates a query in a format understood by the interrogated computer 1) the user request for the interrogated computer 1.

As soon as the user request arrives to the client unit 8, the client unit 8 transfers the request to the agency unit 7 of the interrogated computer 1 connected via the communication channel 3. The agency unit 7 is permanently in an active mode enabling reception of incoming requests. The communication channel 3 for data transfer between the interrogating computer 2 and the interrogated computer 1 is a communication channel of a network such as Ethernet with a standard stack of TCP/IP protocols, or other similar communication channel. Other networks for communication between the two computers are clearly within the scope of the invention.

The agency unit 7 has no direct access to the information on memory use of the interrogated computer 1. The information is stored in the operating system core 4. The information on memory use includes items such as the size and location of data units stored in a computer memory, i.e., the physical addresses of data units in a computer memory. Since the agency unit 7 has no direct access to the information on memory use, the agency unit 7 transfers the request to the operating system core unit 5 of the operating system core 4 through the coupling unit 6. For example, the agency unit 7 converts the code (in ASCII format) of the user request received from the interrogating computer 2 into the binary code so that the user request will be understood by the operating system core 4.

The operating system core unit 5 is a part of the operating system core 4 and may have access to classified information on memory use of the interrogated computer 1. The coupling unit 6 is an intermediary for data transfer from the agency unit 7 to operating system core unit 5 and vice versa. As soon as the request requesting the information on memory use of the interrogated computer 1 is received by the operating system core unit 5, the operating system core unit 5 extracts the information from the operating system core 4. The extracted information is transferred to the client unit 8 of the interrogating computer 2 through the coupling unit 6 and the agency unit 7. Then, the client unit 8 of the interrogating computer 2 receiving the information displays the information on the display unit 9.

A system for displaying information on use of physical memory, set forth in an exemplary, non-limiting embodiment of the present invention, is useful for debugging a remote Linux target. When a software or hardware developer needs to know information on usage of physical memory of a Linux target, the required information can be obtained by operating a system according to an exemplary embodiment of the present invention.

While the exemplary embodiments of the present invention have been particularly shown and described with reference to the accompanying drawing, it will be understood by those of ordinary skill in the art that various changes in form and details may be made therein without departing from the spirit and scope of the present invention as defined by the following claims. It will be understood that the particular method and the structure embodying the invention is shown by way of illustration only and not as a limitation of the invention. The principles and features of this invention may be employed in varied and numerous embodiments without departing from the scope of the invention.

What is claimed is:

1. A system for providing information on memory use of a computer memory, the system comprising:
    at least one interrogating computer, which comprises a client unit connected to a display unit;
    at least one interrogated computer, which comprises an operating system core comprising a kernel, an operating system core unit, a coupling unit, and an agency unit connected with the at least one interrogating computer via a communication channel;
    and the communication channel connecting the at least one interrogating computer and the at least one interrogated computer,
    wherein the client unit operates to generate a user request requesting information on memory use of the at least one interrogated computer, to transfer the user request to the agency unit, to receive the information from the agency unit, and to display the received information on the display unit,
    the information on the memory use of the at least one interrogated computer comprises information on physical addresses of data units of memory,
    the agency unit operates to receive the user request from the client unit, to convert the user request, to transfer the converted user request to the operating system core unit, to obtain the information on the memory use of the at least one interrogated computer from the operating system core unit through the coupling unit, and to transfer the obtained information to the client unit,
    the coupling unit is coupled to the operating system core unit embodied in the operating system core and to the agency unit embodied in the interrogated computer to serve as an intermediary data transfer device between the agency unit and the operating system core unit and operates to establish an access to the operating system core unit and transfer data from the agency unit to the operating system core unit and from the operating system core unit back to the agency unit, and
    the operating system core unit is positioned within the operation system core, obtains, from the operating system core, the information on the memory use of the at least one interrogated computer, and transfers the obtained information to the agency unit through the coupling unit.

2. The system of claim 1, wherein the communication channel connecting the at least one interrogating computer and the at least one interrogated computer is a communication channel of Ethernet with a standard stack of TCP/IP protocols.

3. The system of claim 1, wherein the agency unit is permanently in an active mode and converts a data code of the user request from an ASCII format into a binary code.

4. A method of providing information on usage of a computer memory, the method comprising:
    generating a request requesting information on memory use of at least one interrogated computer in a client unit of at least one interrogating computer, wherein the information on the memory use of the at least one interrogated computer comprises information on physical addresses of data units of memory;
    transferring the generated request to an agency unit of the interrogated computer;
    converting a data code of the request at the agency unit;
    transferring the converted data code to an operating system core unit through a coupling unit;
    extracting the information on the memory use of the interrogated computer from an operating system core through the operating system core unit;
    transferring the extracted information to a client unit of the interrogating computer through the coupling unit and the agency unit; and
    displaying the information on a display unit of the interrogating computer,
    wherein the coupling unit is coupled to the operating system core unit embodied in the operating system core and to the agency unit embodied in the interrogated computer to serve as an intermediary data transfer device between the agency unit and the operating system core unit.

5. The method of claim 4, wherein the data code of the request is converted from an ASCII format into a binary code at the agency unit.

6. The method of claim 4, wherein the information on the physical addresses of the data units of the memory is extracted from the operating system core along with additional information stored in the operating system core.

7. A system for providing information on a computer memory use, the system comprising:
    an operating system core;
    an operating system core unit;
    a coupling unit; and
    an agency unit connected to an interrogating computer by a communication channel,
    wherein the agency unit operates to receive a request requesting the information on the computer memory use from the interrogating computer, converts the request, transfers the converted request to the operating system core unit through the coupling unit, obtains the information on usage of the computer memory from the operating system core unit through the coupling unit, and transfers the obtained information to the interrogating computer,
    the information on the computer memory use of the at least one interrogated computer comprises information on physical addresses of data units of memory,
    the coupling unit is coupled to the operating system core unit embodied in the operating system core and to the agency unit embodied in the interrogated computer to serve as an intermediary data transfer device between the agency unit and the operating system core unit and operates to establish an access to the operating system core unit and transfer data from the agency unit to the operating system core unit and from the operating system core unit back to the agency unit, and
    the operating system core unit is provided within the operation system core, obtains the information on the computer memory use from the operating system core, and transfers the obtained information to the agency unit through the coupling unit.

8. The system of claim 7, wherein the communication channel connecting the interrogating computer and the agency unit is a communication channel of Ethernet with a standard stack of TCP/IP protocols.

9. The system of claim 7, wherein the agency unit is permanently in an active mode and converts a data code of the user request from an ASCII format into a binary code.

10. A method of providing information on usage of a computer memory, the method comprising:
- receiving a request requesting information about memory use of an interrogated computer from an interrogating computer at an agency unit, the information on the memory use of the at least one interrogated computer comprising information on physical addresses of data units of memory;
- converting a data code of the request at the agency unit;
- transferring the converted data code to an operating system core unit through a coupling unit;
- extracting the information about the memory use from an operating system core through the operating system core unit; and
- transferring the extracted information to the interrogating computer through the coupling unit and the agency unit,
- wherein the coupling unit is coupled to the operating system core unit embodied in the operating system core and to the agency unit embodied in the interrogated computer to serve as an intermediary data transfer device between the agency unit and the operating system core unit.

11. The method of claim 10, wherein the data code of the user request is converted from an ASCII format into a binary code.

12. The method of claim 10, wherein the information on the physical addresses of the data units of the memory is extracted from the operating system core along with additional information stored in the operating system core.

13. The system of claim 1, wherein the request comprises data code in an ASCII format and the agency unit converts the ASCII data request into a binary data request to be understood by the operating system core unit which extracts the requested information from the operating system core based on the binary data request.

14. The system of claim 1, wherein the agency unit, embodied in the interrogated computer, is coupled to the coupling unit and the communication channel.

15. The system of claim 1, wherein the interrogated computer comprises a remote LINUX target.

* * * * *